(12) United States Patent
Lin et al.

(10) Patent No.: US 10,380,330 B2
(45) Date of Patent: Aug. 13, 2019

(54) SMART GAMEPAD

(71) Applicant: Google LLC

(72) Inventors: Hsing-Sheng Lin, Taipei (TW); Chia Hang Yeh, Taipei (TW)

(73) Assignee: GOOGLE LLC, Mountain View, CA (US)

( * ) Notice: Subject to any disclaimer, the term of this patent is extended or adjusted under 35 U.S.C. 154(b) by 1470 days.

(21) Appl. No.: 13/754,926

(22) Filed: Jan. 31, 2013

(65) Prior Publication Data

US 2014/0213349 A1  Jul. 31, 2014

(51) Int. Cl.
  *G06F 21/00* (2013.01)
  *G06F 21/30* (2013.01)
  *G06F 21/31* (2013.01)

(52) U.S. Cl.
  CPC .............. *G06F 21/30* (2013.01); *G06F 21/31* (2013.01); *G06F 2221/2109* (2013.01)

(58) Field of Classification Search
  CPC ....................................................... G06F 21/00
  USPC ..................................................... 705/35, 50
  See application file for complete search history.

(56) References Cited

U.S. PATENT DOCUMENTS

| | | | |
|---|---|---|---|
| 8,088,011 B2 | 1/2012 | Russell et al. | |
| 2003/0130032 A1* | 7/2003 | Martinek ................ | G07F 17/32 463/29 |
| 2005/0221895 A1* | 10/2005 | Lum ....................... | A63F 13/06 463/39 |
| 2006/0223634 A1 | 10/2006 | Feldman et al. | |
| 2011/0277027 A1 | 11/2011 | Hayton et al. | |
| 2011/0277030 A1 | 11/2011 | Gillespie et al. | |
| 2012/0258802 A1* | 10/2012 | Weston ................... | A63H 30/04 463/37 |

OTHER PUBLICATIONS

ISR and Written Opinion for PCT/US2014/013365 dated Apr. 17, 2014.

* cited by examiner

*Primary Examiner* — Ojo O Oyebisi
(74) *Attorney, Agent, or Firm* — Morris & Kamlay LLP (57) ABSTRACT

A method for logging into a user gaming account may include connecting with a host game console and receiving a login code at a game controller from the host game console. The login code may be encrypted with a combination key and sent to the host game console. Consequently, user gaming account data may be provided to the host game console. Additionally, a method for receiving user gaming account data may include connecting to a game controller and connecting to a game server. A login code for a gaming account login may be received from the game server and the login code may be sent to the game controller. Next, an encrypted login code that has been encrypted with a combination key may be received from the game controller, and subsequently sent to the game server. Accordingly, user gaming account data may be received from the game controller.

20 Claims, 6 Drawing Sheets

SMART GAMEPAD

BACKGROUND

Traditional game controllers are merely accessories of various gaming consoles and are not capable of storing gaining account information/data and communicating stored gaming account information/data with other devices, such as game console units, gaming servers, or the like. As a result, the conventional gaming experience typically is limited to the boundaries of a particular game console. Currently, it is impossible for a user to log in to multiple different gaming consoles with their unique game controller in order play a game individually or with other players.

BRIEF SUMMARY

According to an implementation of the disclosed subject matter, a method for logging into a user gaming account may include connecting with a host game console and receiving a login code at a game controller from the host game console. The login code may be encrypted with a combination key and the encrypted login code may be sent to the host game console. Additionally, user gaming account data may be provided to the host game console.

According to an implementation of the disclosed subject matter, a method for receiving user gaming account data may include connecting to a game controller and connecting to a game server. A login code for a gaming account login may be received from the game server and the login code may be sent to the game controller. Next, an encrypted login code that has been encrypted with a combination key may be received from the game controller. The encrypted login code may then be sent to the game server. As a result, user gaming account data may be received from the game controller.

According to an implementation of the disclosed subject matter, a system may include a computer-readable medium storing user gaming account data. The system may also include a processor configured to connect with a host game console and receive a login code at a game controller from the host game console. The login code may be encrypted with a combination key and the encrypted login code may be sent to the host game console. Accordingly, user gaming account data may be provided to the host game console.

According to an implementation of the disclosed subject matter, a system may include a processor configured to connect to a game controller and a game server. A login code for a gaming account login may be received from the game server. The login code may be sent to the game controller, and subsequently, the encrypted login code that has been encrypted with a combination key may be received from the game controller. Next, the encrypted login code may be sent to the game server, and as a result, user gaming account data may be received from the game controller.

According to an implementation of the disclosed subject matter, a computer readable medium may store instructions causing a processor to connect with a host game console and receive a login code at a game controller from the host game console. The login code may be encrypted with a combination key and sent to the host game console. Accordingly, user gaining account data may be sent to the host game console.

According to an implementation of the disclosed subject matter, a computer readable medium may store instructions that cause a processor to connect to a game controller and a game server. A login code for a gaming account login may be received from the game server and the login code may be sent to the game controller. An encrypted login code that has been encrypted with a combination key may be received from the game controller. Next, the encrypted login code may be sent to the game server, and as a result, user gaming account data may be received from the game controller.

Additional features, advantages, and implementations of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

The gaming experience may be improved if a user can log in to a host gaming console using their unique personal game controller. By logging into a host gaming console from a user's personal game controller, the host game console may then automatically receive the user's gaming account information/data, thereby enhancing a user's gaming experience.

An implementation of the disclosed subject matter proposes systems and methods for logging into a user gaming account on a host game console. A user having their own personal game controller may wish to play games on different host game consoles. For example, a user may wish to use a game console at their home, a friend's house, or a public location, such as a mall, an arcade, or a gaming convention. With a personal game controller, a user can login to their gaining account at any host game console. The pairing protocol allows the game controller to communicate with and authenticate to a host game console in the background, without user input. Since the user is not prompted or required to input any security information, the game controller may log in or otherwise pair to a host game console without users seeing each other's login information and thereby prevent the exposure of personal information on a public host game console. Additionally, this may allow for personal information security and fast login.

The game controller also may connect with a variety of types of gaming consoles, such as consoles from different manufacturers, and allow access to a user's gaming account info at each host console with which the controller is paired. Once logged in, the host game console is provided with the user's gaming account information which may be stored on the user's game controller. Gaming account information may include a user's name, photo, gaming credits, game progress, avatar, and other personal preferences. For example, a social gaming session may allow for multiple users, each having their own unique personal game controller, to connect with and login to a host game console and play a game together. In this regard, each user's gaming account information is provided to the host game console thereby enhancing the gaming experience.

In particular, an implementation of the disclosed subject matter provides a method for logging into a user gaming account which includes connecting a game controller to a host game console. This process may be performed over a wired or wireless connection. For example, pairing or other connection of the game controller to the host game console may be triggered by various events, such as a wire connection event, near field communications (NFC) pairing event, Bluetooth pairing event, and scanning of a QR code. Next, a login code may be sent by the host game console and received by the game controller. At the game controller, the login code may be encrypted with a combination key, typically without any further user input, and the encrypted login code may then be sent to the host game console. As a result, the game controller may be authenticated to the game console and the user's gaming account data may be provided to the host game console.

Additionally, the game controller may be authenticated to multiple host game consoles, regardless of the type of game console. For example, a user's game controller may connect with the user's game console made by one manufacturer at the user's home as well as another game console made by a different manufacturer at a gaming convention, allowing access to the user's gaming account into at each host console with which the controller is paired.

Figure 5:
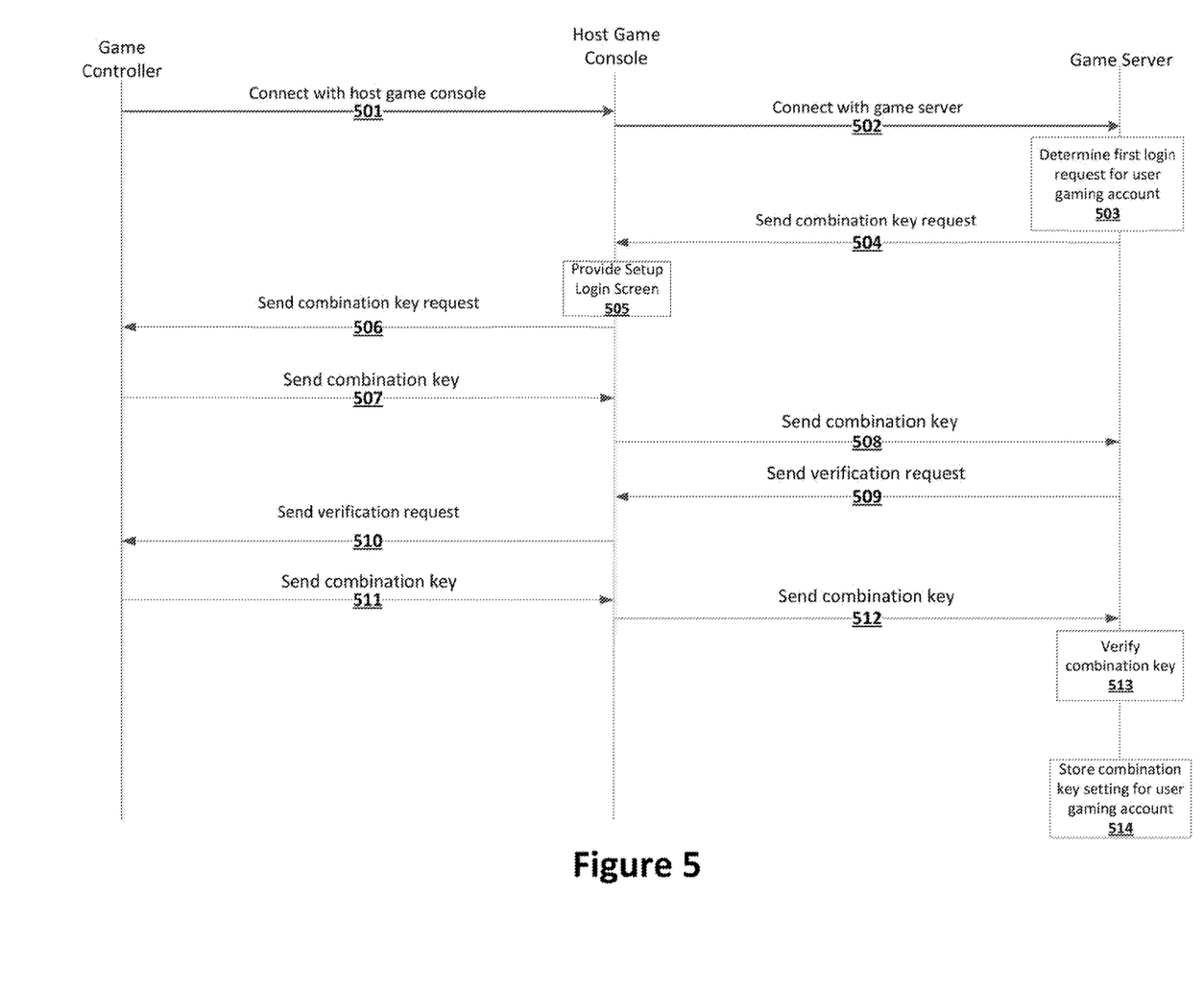
FIG. 5 shows an example information flow according to an implementation of the disclosed subject matter.

Implementations of the disclosed subject matter may include techniques for an initial setup between the game controller and either or both of the host game console and the game server. This initial set up process may occur prior to logging into a user gaming account from a game controller and/or receiving user gaming account data at a host game console, as described below. FIG. 5 shows an example data exchange according to an implementation of the disclosed subject matter regarding the initial set up process. As shown, a game controller may connect with a host game console at 501 by wired or wireless communication protocol. Next, the host game console may connect with the game server at 502. The game server may determine this to be the first login request for the user gaming account at 503. As a result, the game server may send a combination key request to the host game console at 504 and the host game console may provide a login screen or similar interface at 505. Next, the host game console may send the combination key request to the game controller at 506. In response, the game controller may send the combination key to the host game console at 507, and the host game console may send the combination key to the game server at 508. The game server may then send a verification request to the host game console at 509. For example, this verification request may include additional requests for the combination key, and as a result, the host game console may send another combination key request to the game controller at 510. The game controller may then resend the combination key to the host game console at 511, and the host game console may resend the combination key to the game server at 512. Next, the game server may verify the combination key at 513 by determining that the first received combination key matches the second received combination key. Accordingly, the game server may store the combination key setting for the user gaming account at 514 for future login events. If the combination key cannot be verified, the initial set up may fail, and the gaming server may start the set up process again by sending a combination key request to the host game console at 504.

As an example, a user may wish to start the initial set up process for his new game controller. Once the game controller is within a wireless protocol range from a host game console, the game controller may connect with the host game console, such as by a Bluetooth connection. Next, the host game console may connect with a game server and the game server may determine this to be the first game controller login request for the user's gaining account. As a result, the game server may send a combination key request to the host game console. The host game console may provide the user with a login screen. The login screen may indicate to the user that the initial set up process is in progress. Next, the host game console may send the combination key request to the game controller. The combination key may be stored in the game controller and, thus, the game controller may send the combination key to the host game console. Next, the host game console may send the combination key to the game server. The game server may then send a verification request. For example, the verification request may include additional requests for the combination key. The game controller may then resend the combination key to the game server. Next, the game server may verify the combination key by determining that the first received combination key matches the second received combination key. Accordingly, the game server may store the combination key setting for the user's gaming account for authenticating future login events. If the combination key cannot be verified, the user may be notified that initial set up failed and the game server may start the set up process again by sending a combination key request.

Figure 1:
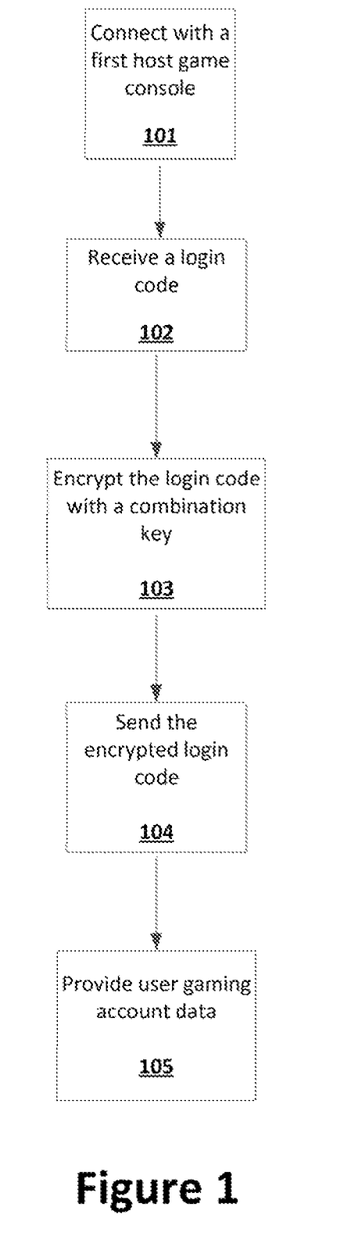
FIG. 1 shows an example process according to an implementation of the disclosed subject matter.

Implementations of the disclosed subject matter may include techniques for logging into a user gaming account from a game controller. The log in process may occur subsequent to a successful initial set up process described above and shown in FIG. 5. FIG. 1 shows an example of such a log in process. As shown, upon connecting the game controller with a first host game console by a wired or wireless protocol connection at 101, a login code may be received at the game controller from the first host game console at 102. The game controller may encrypt the first login code with a combination key at 103. The combination key may be the combination key previously verified during the initial set up process described above. Next, the game controller may send the encrypted first login code to the first host game console at 104. The encrypted first login code may be verified. For example, the encrypted first login code may be verified by encrypting the known login code with the previously stored combination key from the initial setup process, and verifying that the login code encrypted with the combination key matches the encrypted, previously stored combination key from the initial set up process. If the encrypted login code is verified, the game controller may provide user gaming account data to the first host game console at 105.

Additionally, the present disclosure provides a method for receiving user gaming account data which includes a host game console that connects to a game controller and a game server. First, the host game console may receive a login code for gaming account login from the game server and may send the login code to the game controller. Next, the host game console receives, from the game controller, an encrypted login code that has been encrypted with a combination key. The host game console then sends the encrypted login code to the game server, and subsequently receives user gaming account data from the game controller. Further, the host game console may connect with multiple game controllers, allowing the host game console to receive user gaming account information for multiple users from each users' game controller, separately or simultaneously.

Figure 2:
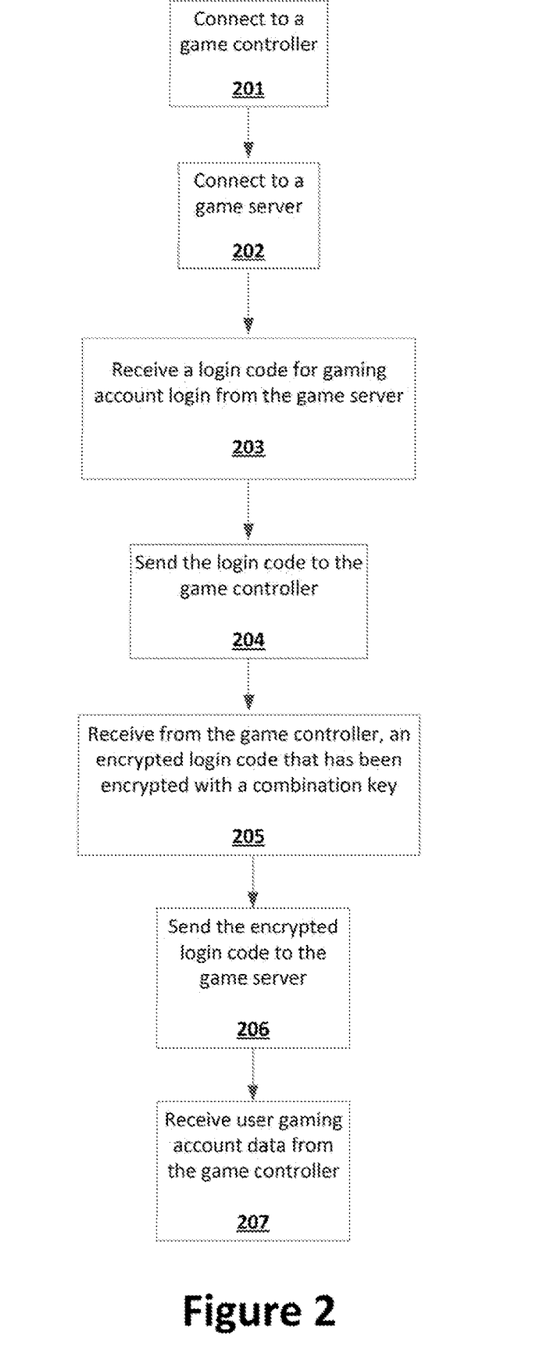
FIG. 2 shows an example process according to an implementation of the disclosed subject matter.

Implementations of the disclosed subject matter may include techniques for receiving user gaming account data at a host game console. FIG. 2 shows an example of such a process for receiving user gaming account data. As shown, a host game console may connect with a game controller at 201 and connect with a game server at 202. The host game console may receive a login code for gaming account login from the game server at 203. The host game console may send the login code to the game controller at 204. The game controller encrypts the login code using the combination key previously stored at the game controller, and sends the encrypted login code to the host game console. The host game console may receive the encrypted login code that has been encrypted with the combination key from the game controller at 205, and the encrypted login code may be sent to the game server at 206. The game server may verify the encrypted login code. For example, the game server may verify the encrypted login code by verifying that the login code encrypted with the combination key matches the previously stored combination key from the initial set up process. If the encrypted login code is successfully verified, the host game console may receive user gaming account data from the game controller at 207.

A login code may be a hexadecimal number, binary code, proprietary code, encrypted value, hash value, or any other similar identification code that is capable of being encrypted using the combination key described above.

Figure 3:
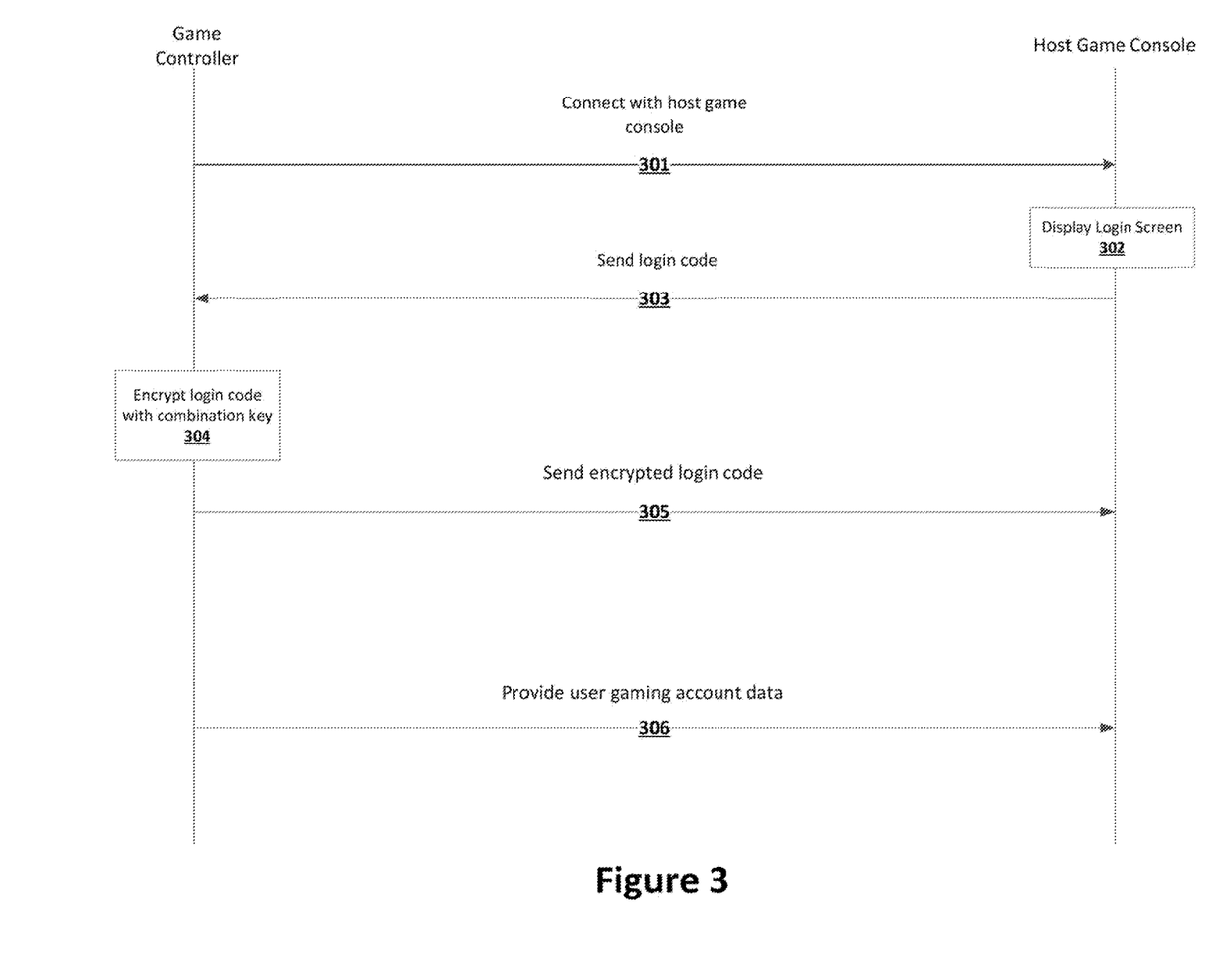
FIG. 3 shows an example information flow according to an implementation of the disclosed subject matter.

FIG. 3 shows an example data exchange according to an implementation of the disclosed subject matter. As previously described, logging into a user gaming account from a game controller may include connecting with a host game console, at 301. Upon connecting with a host game console, the host game console may display a login screen at 302 and subsequently send a login code to the game controller, at 303. The game controller may then encrypt the login code with the combination key previously verified during the initial set up process, such as at 304. The game controller may then send the encrypted login code to the host game console, at 305. The encrypted login code may be verified. For example, the encrypted login code may be verified by verifying that the login code encrypted with the combination key matches the combination key previously stored during the initial set up process. As a result of successful verification, the game controller may provide user gaming account data to the host game console, at 306.

Figure 4:
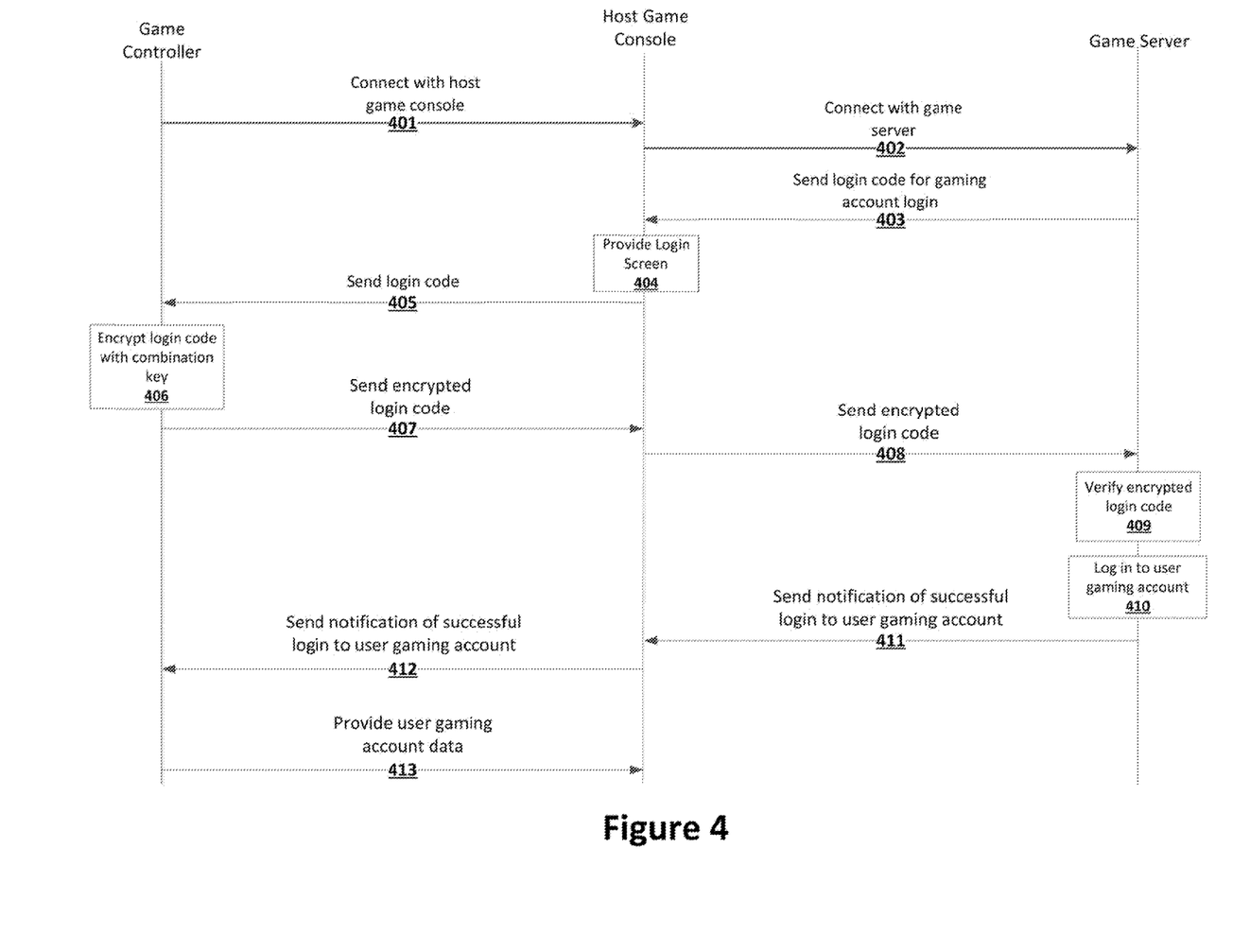
FIG. 4 shows an example information flow according to an implementation of the disclosed subject matter.

FIG. 4 shows an example data exchange according to an implementation of the disclosed subject matter. As described above, receiving user gaming account data at a host game console may include a game controller connecting with a host game console at 401, and the host game console subsequently connecting with a game server at 402. The game server may then send a login code for gaming account login to the host game console, at 403. The host game console may then provide a login screen at 404 and send the login code to the game controller at 405. The game controller may encrypt the login code with a combination key at 406. For example, the combination key may be the combination key that was previously verified during the initial set up process. The game controller may send the encrypted login code to the host game console at 407. The host game console may then send the encrypted login code to the game server at 408. The game server may verify the encrypted login code at 409. For example, the game server may verify the encrypted login code by determining that the combination key matches the combination key previously stored during the initial set up process. If the encrypted login code is correctly verified, the game server may then log in to the user gaming account at 410. Next, the game server may send to the host game console, a notification of successful login to the user gaming account at 411. Subsequently, the host game console may send to the game controller, a notification of successful login to the user gaming account at 412. As a result, the game controller may provide user gaming account data to the host game console at 413. If however, the encrypted login code is not correctly verified, the game server may not log into the user gaming account. In this case, the game server may re-start the log in process and send a new login code for gaming account login, at 403.

As an example, the user may take their previously set up game controller to a friend's house. Once the user's game controller is within a wireless protocol range from his friend's game console, the user's game controller may connect with his friend's game console, such as by Bluetooth connection. The game console may connect with the game server, and the game server may then send a login code for gaming account login. The host game console may then provide a login screen indicating that the login process is in progress. The game controller may encrypt the login code with the combination key. For example, the combination key may be stored at the game controller that was previously verified by the game server during the initial set up process. The game controller may send the encrypted login code to the game server, directly or by way of the game console. The game server may verify the encrypted login code. For example, the game server may verify the encrypted login code by verifying that the combination key matches the combination key previously stored during the initial set up process. If the encrypted login code is correctly verified, the game server may then log in to the user's gaming account and send a notification of successful login. As a result, the game controller may provide the user's gaming account data to his friend's game console. If however, the encrypted login code is not correctly verified, the game server may not log into the user gaming account and may re-start the log in process and send a new login code for gaming account login.

A host game console may be any interactive entertainment system or computer such as a set-top box, mobile device, PC, laptop, tablet, television, game machine, or the like.

As used herein, a game controller may be a device type including a game pad, mobile device, tablet, keyboard, mouse, joystick, virtual reality device, or a game-specific device. A game-specific device may be a device that is related to the subject matter of a particular game such as a racing wheel, gear shift, trackball, musical instrument, balance board, workout/fitness equipment, physical game-related item such as a simulated pistol, sport equipment, flight control, control pedals, handlebars, and the like.

Additionally, the game controller may have storage capability for storing various data and credentials such as user gaming account data/information and user gaming account login information. The game controller may have communication capability based on various wired and wireless communication protocols such as a physical wire, USB, Wi-Fi, Bluetooth, interact, and the like.

As used herein, user gaming account information/data may include user name, image, game data, photo, avatar, billing information, control preferences, and other user preferences and settings. Game data may include game credits, game progress, score, game-related items, characters, avatar, character-attributes, statistics, character status, and the like.

Figure 6:
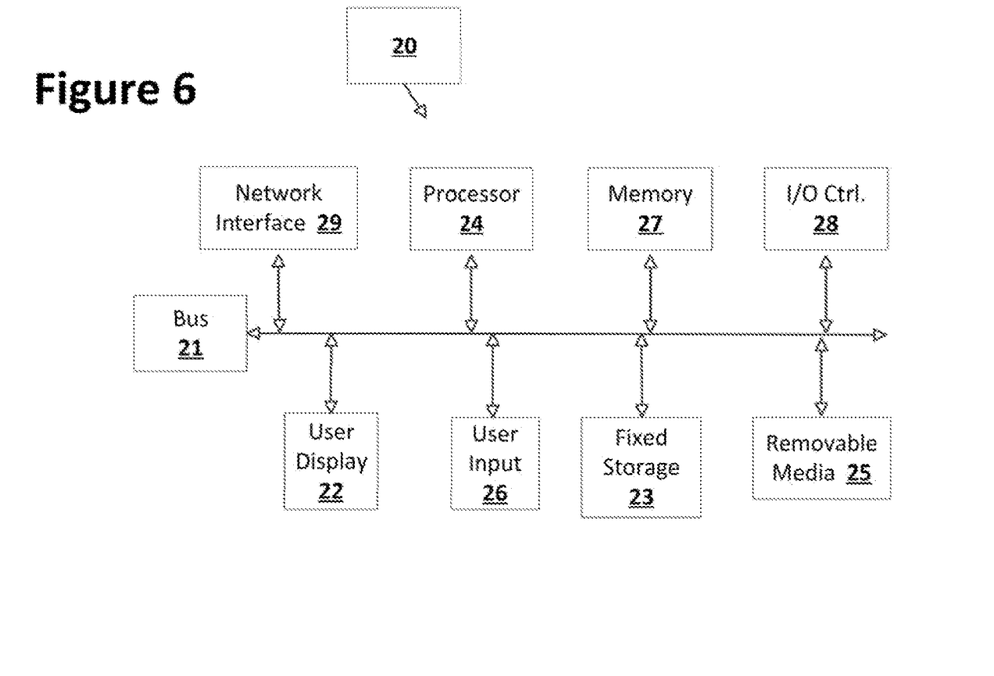
FIG. 6 shows a computer according to an implementation of the disclosed subject matter.

Implementations of the presently disclosed subject matter may be implemented in and used with a variety of component and network architectures. FIG. 6 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 7.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 7:
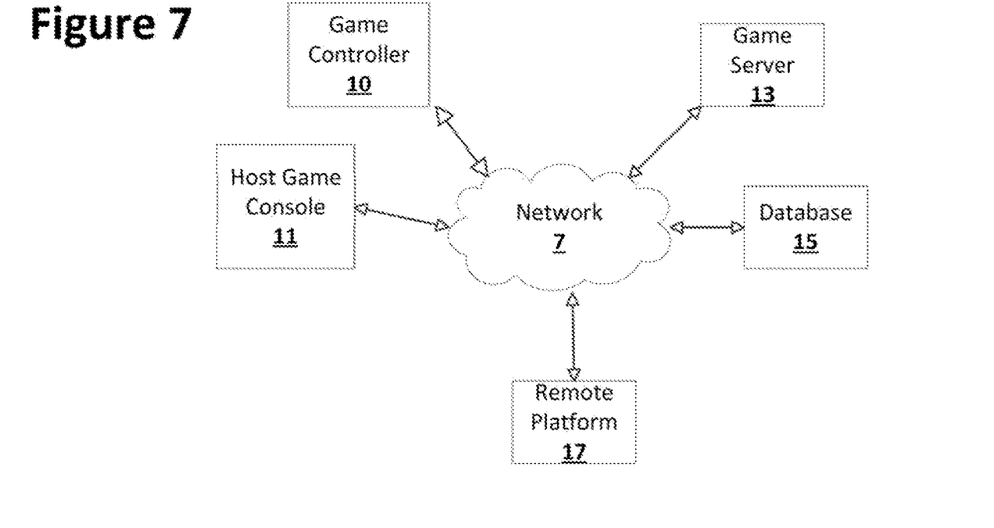
FIG. 7 shows a network configuration according to an implementation of the disclosed subject matter.

FIG. 7 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the systems discussed here collect personal information about users, or may make use of personal information, the users may be provided with an opportunity to control whether programs or features collect user information (e.g., information about a user's social or gaming networks, social/gaming actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method for logging into a user gaming account, comprising:
   detecting, using a hardware processor of a game controller, a first host game console;
   in response to detecting the first host game console, determining, using the hardware processor of the game controller, that the game controller is capable of being connected with a plurality of game consoles that includes the first host game console;
   in response to determining that the game controller is capable of being connected with the plurality of game consoles that includes the first host game console, connecting, using the hardware processor of the game controller, to the first host game console over a wireless communication network;
   receiving, using the hardware processor of the game controller, a first login code for the user gaming account from a gaming server via the first host game console and over the wireless communications network, the first login code being a hexadecimal number, binary code, proprietary code, hash value, or identification code;
   determining, using the hardware processor of the game controller, that the first login code from the gaming server is capable of being encrypted;
   in response to determining that the first login code is capable of being encrypted, encrypting, using the hardware processor of the game controller, the first login code with a combination key stored in a storage device of the game controller without any input from a user;
   transmitting, using the hardware processor of the game controller, the encrypted first login code to the first host game console over the wireless communications network to determine whether the combination key within the encrypted first login code matches a previously stored combination key from an initial setup of the game controller with the gaming server, the combination key being associated with the user gaming account; and
   transmitting, using the hardware processor of the game controller, user gaming account data to the first host game console over the wireless communications network based on a verification that the combination key within the encrypted first login code matches the previously stored combination key.

2. The method of claim 1, wherein the game controller is a device type selected from the group consisting of a game pad, mobile device, tablet, keyboard, mouse, joystick, or a game-specific device.

3. The method of claim 1, wherein the user gaming account data includes at least one selected from the group consisting of user name, image, game data, photo, avatar, and other user preferences.

4. The method of claim 1, further comprising:
   connecting with a second host game console,
   receiving a second login code at the game controller from the second host game console,
   encrypting the second login code with the combination key and sending the encrypted second login code to the second host game console, and
   providing user gaming account data to the second host game console.

5. The method of claim 4, wherein each the first host game console and the second host game console is a device type selected from the group consisting of a set-top box, mobile device, PC, laptop, tablet, television, or game machine.

6. The method of claim 4, wherein the device type of the first host game console is different from the device type of the second host game console.

7. A game controller, comprising:
   a non-transitory computer-readable medium storing user gaming account data and a stored combination key; and
   a hardware processor configured to:
      detect a first host game console,
      in response to detecting the first host game console, determine that the game controller is capable of being connected with a plurality of game consoles that includes the first host game console,
      in response to determining that the game controller is capable of being connected with the plurality of game consoles that includes the first host game console, connect with the first host game console and over the wireless communications network,
      receive a first login code at a game controller for the user gaming account from a gaming server via the first host game console and over the wireless communications network, the first login code being a hexadecimal number, binary code, proprietary code, hash value, or identification code,
      determine that the first login code from the gaming server is capable of being encrypted,
      in response to determining that the first login code is capable of being encrypted, encrypt the first login code with the stored combination key in the non-transitory computer-readable medium of the game controller without any input from a user,
      transmit the encrypted first login code to the first host game console to determine whether the stored combination key within the encrypted first login code matches a previously stored combination key from an initial setup of the game controller with the gaming server, and
      transmit the user gaming account data to the first host game console based on a verification that the stored combination key within the encrypted first login code matches the previously stored combination key.

8. The game controller of claim 7, wherein the user gaming account data includes at least one selected from the group consisting of user name, image, game data, photo, avatar, and other user preferences.

9. The system of claim 7, wherein the processor is further configured to:
    connect with a second host game console,
    receive a second login code from the second host game console,
    encrypt the second login code with the combination key and send the encrypted second login code to the second host game console, and
    provide the user gaming account data to the second host game console.

10. The game controller of claim 9, wherein each the first host game console and the second host game console is a device type selected from the group consisting of a set-top box, mobile device, PC, laptop, tablet, television, or game machine.

11. The game controller of claim 10, wherein the device type of the first host game console is different from the device type of the second host game console.

12. A non-transitory computer readable medium storing a plurality of instructions that cause a processor to:
    detect, using a game controller, a first host game console,
    in response to detecting the first host game console, determine, using the game controller, that the game controller is capable of being connected with a plurality of game consoles that includes the first host game console;
    in response to determining that the game controller is capable of being connected with the plurality of game consoles that includes the first host game console, connect, using the game controller, with the first host game console over a communications network;
    receive, using the game controller, a first login code for the user gaming account from a gaming server via the first host game console and over the wireless communications network, the first login code being a hexadecimal number, binary code, proprietary code, hash value, or identification code;
    determine, using the game controller, that the first login code from the gaming server is capable of being encrypted;
    in response to determining that the first login code is capable of being encrypted, encrypt, using the game controller, the first login code with a combination key stored in a storage device of the game controller without any input from a user;
    transmit, using the game controller, the encrypted first login code to the first host game console over the wireless communications network to determine whether the combination key within the encrypted first login code matches a previously stored combination key from an initial setup of the game controller with the gaming server, the combination key being associated with the user gaming account; and
    transmit, using the game controller, user gaming account data to the first host game console over the wireless communications network based on a verification that the combination key within the encrypted first login code matches the previously stored combination key.

13. The computer readable medium of claim 12, wherein the processor is further configured to:
    connect with a second host game console,
    receive a second login code from the second host game console,
    encrypt the second login code with the combination key and send the encrypted second login code to the second host game console, and
    provide the user gaming account data to the second host game console.

14. The computer readable medium of claim 13, wherein each the first host game console and the second host game console is a device type selected from the group consisting of a set-top box, mobile device, PC, laptop, tablet, television, or game machine.

15. The computer readable medium of claim 14, wherein the device type of the first host game console is different from the device type of the second host game console.

16. The game controller of claim 7, wherein the game controller is a smart phone.

17. The game controller of claim 7, wherein the processor is configured to encrypt the first login code and send the encrypted first login code without any input from the user.

18. The game controller of claim 7, wherein the processor is further configured to receive the combination key from a game server and store the combination key in the non-transitory computer-readable medium.

19. The game controller of claim 18, wherein the processor is further configured to send the encrypted first login code data directly to the game server.

20. The method of claim 1, wherein the game controller automatically encrypts the first login code with the combination key and automatically sends the encrypted first login code from the game controller to the first host game console.

* * * * *